United States Patent
Papakipos et al.

(10) Patent No.: US 7,136,070 B1
(45) Date of Patent: Nov. 14, 2006

(54) SYSTEM, METHOD AND COMPUTER PROGRAM PRODUCT FOR USING AN ARBITRARY QUANTITY AS TEXTURE ADDRESS

(75) Inventors: Matthew N. Papakipos, Palo Alto, CA (US); Walter E. Donovan, Saratoga, CA (US); Harold Robert Feldman Zatz, Palo Alto, CA (US); Henry Packard Moreton, Woodside, CA (US); John Erik Lindholm, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 28 days.

(21) Appl. No.: 10/444,418

(22) Filed: May 23, 2003

Related U.S. Application Data

(63) Continuation-in-part of application No. 09/885,382, filed on Jun. 19, 2001, now Pat. No. 6,870,540, which is a continuation-in-part of application No. 09/586,249, filed on May 31, 2000, and a continuation-in-part of application No. 09/454,516, filed on Dec. 6, 1999, now Pat. No. 6,198,488.

(51) Int. Cl.
*G09G 5/00* (2006.01)
*G06F 12/06* (2006.01)

(52) U.S. Cl. .................................. 345/582; 345/572
(58) Field of Classification Search ............ 345/582, 345/586, 564, 565, 566, 572
See application file for complete search history.

(56) References Cited

U.S. PATENT DOCUMENTS

| | | | | |
|---|---|---|---|---|
| 4,823,260 A | * | 4/1989 | Imel et al. | 712/222 |
| 5,905,819 A | * | 5/1999 | Daly | 382/284 |
| 6,188,409 B1 | * | 2/2001 | Pajarre et al. | 345/582 |
| 6,333,747 B1 | * | 12/2001 | Murata et al. | 345/582 |
| 6,747,660 B1 | * | 6/2004 | Olano et al. | 345/582 |
| 6,825,851 B1 | * | 11/2004 | Leather | 345/584 |
| 2002/0003541 A1 | * | 1/2002 | Boyd et al. | 345/501 |
| 2003/0122841 A1 | * | 7/2003 | Berglas | 345/582 |

* cited by examiner

*Primary Examiner*—Kee M. Tung
*Assistant Examiner*—Aaron M. Richer
(74) *Attorney, Agent, or Firm*—Patterson & Sheridan, L.L.P.

(57) ABSTRACT

A system, method and computer program product are provided for programmable pixel processing in a computer graphics pipeline. In one embodiment of the present invention, a computed arbitrary quantity is applied as texture address.

36 Claims, 7 Drawing Sheets

| OPCODE | INPUT (SCALAR OR VECTOR) | OUTPUT (SCALAR OR VECTOR) |
|---|---|---|
| NOP | | |
| TEX, TXP | V | V |
| TXD | V,V,V | V |
| DDX, DDY | V | V |
| MOV | V | V |
| MUL | V,V | V |
| ADD | V,V | V |
| MAD | V,V,V | V |
| RCP | S | SSSS |
| RSQ | S | SSSS |
| DP3 | V,V | SSSS |
| DP4 | V,V | SSSS |
| DST | V,V | V |
| MIN, MAX | V,V | V |
| PK2, PK4 | V | S |
| UP2, UP4 | S | V |
| SLT, SGE | V,V | V |
| FRC, FLR | V | V |
| KIL | RC | |
| EXP | S | V |
| LOG | S | V |
| LIT | V | V |

SYSTEM, METHOD AND COMPUTER PROGRAM PRODUCT FOR USING AN ARBITRARY QUANTITY AS TEXTURE ADDRESS

RELATED APPLICATIONS

This application is a continuation-in-part of U.S. application Ser. No. 09/885,382, now U.S. Pat. No. 6,870,540 filed Jun. 19, 2001, which is a continuation-in-part of an application entitled "SYSTEM, METHOD AND ARTICLE OF MANUFACTURE FOR A PROGRAMMABLE VERTEX PROCESSING MODEL WITH INSTRUCTION SET" filed May 31, 2000 under Ser. No. 09/586,249, and an application entitled "METHOD, APPARATUS AND ARTICLE OF MANUFACTURE FOR TRANSFORMING, LIGHTING AND RASTERIZATION ON A SINGLE SEMICONDUCTOR PLATFORM" filed Dec. 6, 1999 under Ser. No. 09/454,516 now U.S. Pat. No. 6,198,488. These applications are herein incorporated by reference.

The present invention relates to computer graphics, and more particularly to providing programmability in a computer graphics processing pipeline.

BACKGROUND OF THE INVENTION

Graphics application program interfaces (API's) have been instrumental in allowing applications to be written to a standard interface and to be run on multiple platforms, i.e. operating systems. Examples of such graphics API's include Open Graphics Library (OpenGL®) and Direct 3D™ (D3D™) pipelines. OpenGL® is the computer industry's standard graphics API for defining 2-D and 3-D graphic images. With OpenGL®, an application can create the same effects in any operating system using any OpenGL®-adhering graphics adapter. OpenGL® specifies a set of commands or immediately executed functions. Each command directs a drawing action or causes special effects.

Thus, in any computer system which supports this OpenGL® standard, the operating system(s) and application software programs can make calls according to the standard, without knowing exactly any specifics regarding the hardware configuration of the system. This is accomplished by providing a complete library of low-level graphics manipulation commands, which can be used to implement graphics operations.

A significant benefit is afforded by providing a predefined set of commands in graphics API's such as OpenGL®. By restricting the allowable operations, such commands can be highly optimized in the driver and hardware implementing the graphics API. On the other hand, one major drawback of this approach is that changes to the graphics API are difficult and slow to be implemented. It may take years for a new feature to be broadly adopted across multiple vendors.

With the integration of transform operations into high speed graphics chips and the higher integration levels allowed by semiconductor manufacturing, it is now possible to make part of the pipeline accessible to the application writer. There is thus a need to exploit this trend in order to afford increased flexibility in visual effects. In particular, there is a need to provide a new computer graphics programming model and instruction set that allows convenient implementation of changes to the graphics API, while preserving the driver and hardware optimization afforded by currently established graphics API's.

SUMMARY OF THE INVENTION

A system, method and computer program product are provided for programmable pixel processing in a computer graphics pipeline. In one embodiment of the present invention, a computed arbitrary quantity is applied as texture address.

Specifically, the present invention discloses a programmable pixel processor that is able to fetch an instruction set, e.g., an instruction set for texture lookup. The instruction set can be stored in a storage that can be accessed by the pixel processor. In fact, the instruction set can be written at a later time and loaded into a storage to be fetched by the pixel processor, thereby allowing the pixel processor to be fully programmable. This novel approach addresses the criticality where texture coordinates are limited to a small set of possible inputs, e.g., interpolated values and predefined simple functions. Removal of the restriction increases by a very large quantity the number of interesting pixel shader programs (instruction sets) that can be written. Additionally, this programmable approach will allow such programs to be written in a more efficient and flexible manner to produce a particular effect.

BRIEF DESCRIPTION OF THE DRAWINGS

The foregoing and other aspects and advantages are better understood from the following detailed description of a preferred embodiment of the invention with reference to the drawings, in which.

DESCRIPTION OF THE PREFERRED EMBODIMENTS

Figure 1:
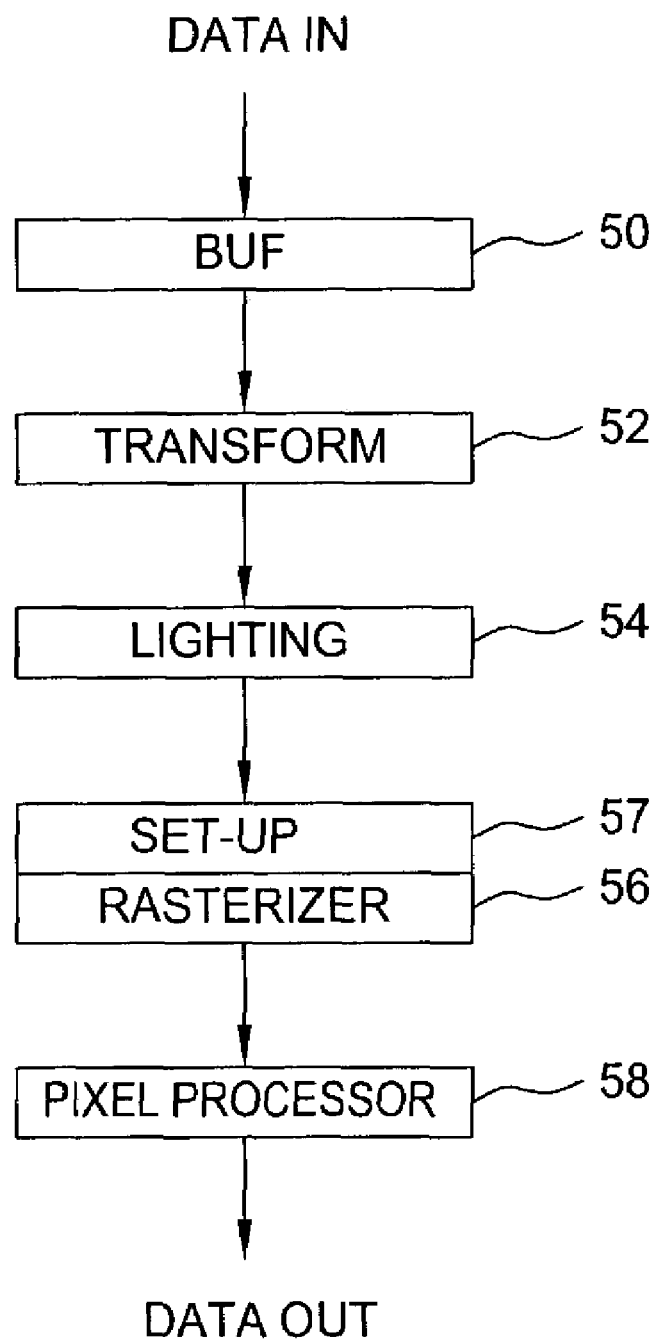
FIG. 1 is a schematic diagram illustrating a graphics pipeline in accordance with one embodiment of the present invention.

FIG. 1 is a schematic diagram illustrating a graphics pipeline in accordance with one embodiment of the present invention. As shown, the present embodiment involves a plurality of modules including an attribute buffer 50, a transform module 52, a lighting module 54, a rasterization module 56 with a set-up module 57, and a pixel processing module 58.

As an option, each of the foregoing modules may be situated on a single semiconductor platform. In the present description, the single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional CPU and bus implementation. Of course, the present invention may also be implemented on multiple semiconductor platforms and/or utilizing a conventional CPU and bus implementation.

During operation, the buffer 50 is included for gathering and maintaining a plurality of attributes. Completed vertices are processed by the transform module 52 and then sent to the lighting module 54. The transform module 52 generates parameters for the lighting module 54 to light. The output of the lighting module 54 is screen space data suitable for the set-up module which, in turn, sets up primitives. Thereafter, rasterization module 56 carries out rasterization of the primitives. In particular, the rasterization module 56 passes on pixel data including, but not limited to a position, a pixel diffuse color, a specular color, a fog value, a plurality of texture coordinates, and/or any other information relating to the pixels involved with the processing in the graphics pipeline.

A pixel processing module 58 is coupled to the rasterization module 56 for processing the pixel data. The pixel processing module 58 begins by reading the pixel data generated by the rasterization module 56. In operation, the pixel processing module 58 outputs a color and a depth value. Pixel processing module 58 can be implemented in accordance with application specific requirements. For example, pixel processing module 58 can be implemented as disclosed in US patent application entitled "Programmable Pixel Shading Architecture", filed on Jun. 19, 2001 with Ser. No. 09/885,242, which is also assigned to the assignee of the present application. This patent application is herein incorporated by reference.

Table 1 illustrates operations that may be done after the pixel processing module 58 is finished. A standard application program interface (API) state may be used as appropriate, as will soon become apparent.

TABLE 1

Figure 2:
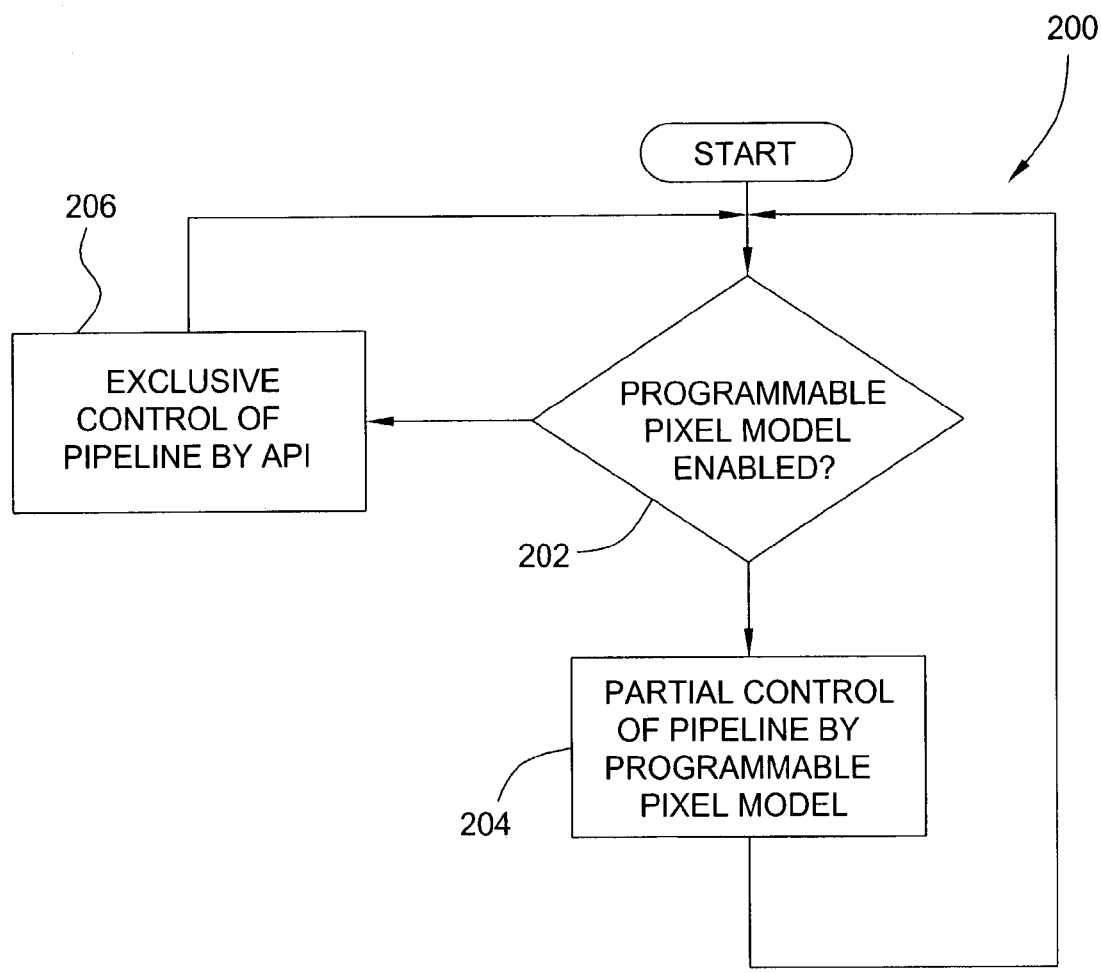
FIG. 2 illustrates the overall operation of the various components of the graphics pipeline of FIG. 1.

Scissor
Color Format Conversion
Alpha Test
Zbuffer/Stencil
Blendfunction
Logicop
Dither
Writemask FIG. 2 illustrates a high level operation 200 of the pixel processing module 58 of FIG. 1. As shown, it is constantly determined in decision 202 whether current operation invokes a programmable pixel model of the present invention. If so, a mode is enabled that partially supercedes the pixel processing of the standard graphics API, thus providing increased flexibility in generating visual effects. See operation 204.

When disabled, the present invention allows increased or exclusive control of the graphics pipeline by the standard graphics API, as indicated in operation 206. In one embodiment, states of the standard graphics API may not be overruled by invoking the programmable pixel mode of the present invention. In one embodiment, no graphics API state may be directly accessible by the present invention, with the exception of the bound texture state.

In one embodiment, the standard graphics API may include Open Graphics Library (OpenGL®) and/or D3D™ APIs. OpenGL® is the computer industry's standard API for defining 2-D and 3-D graphic images. With OpenGL®, an application can create the same effects in any operating system using any OpenGL®-adhering graphics adapter. OpenGL® specifies a set of commands or immediately executed functions. Each command directs a drawing action or causes special effects. OpenGL® and D3D™ APIs are commonly known to those of ordinary skill, and more information on the same may be had by reference to the OpenGL® specification Version 2.1, which is incorporated herein by reference in its entirety.

As is well known, OpenGL® mandates a certain set of configurable computations defining transformation, texture coordinate generation and transformation, and lighting. Several extensions have been developed to provide further computations to OpenGL®.

Figure 3:
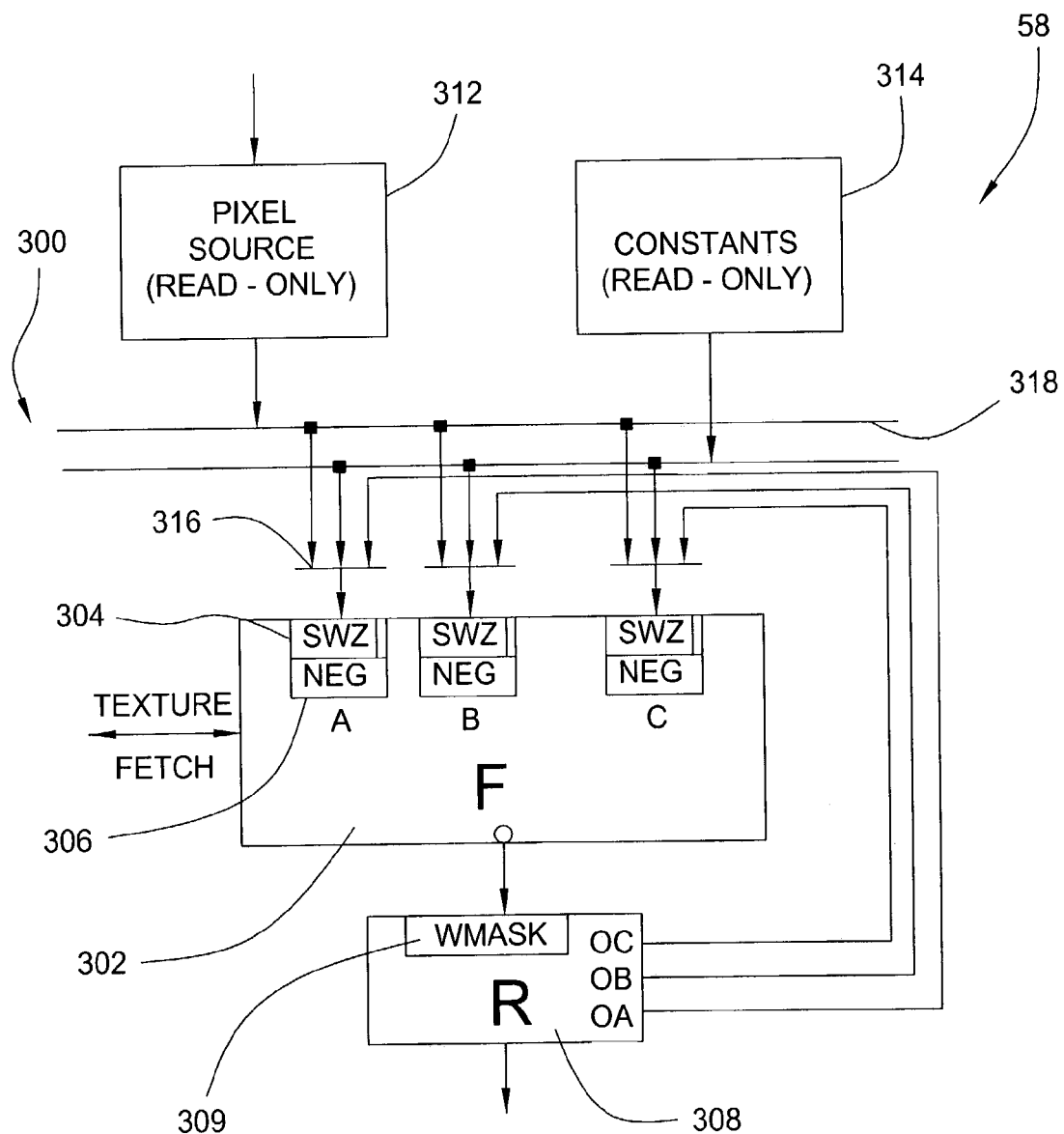
FIG. 3 is a schematic diagram illustrating an exemplary model of the pixel processing module in accordance with one embodiment of the present invention.

FIG. 3 is a schematic diagram illustrating an exemplary model 300 of the pixel processing module 58 in accordance with one embodiment of the present invention. Such programming model 300 may be adapted to work with hardware accelerators of various configuration and/or with central processing unit (CPU) processing.

As shown in FIG. 3, the pixel processing module 58 includes a functional module 302 that is capable of carrying out a plurality of different types of operations. The functional module 302 is equipped with three inputs and an output. Associated with each of the three inputs are a swizzling module 304 and a negating module 306 for purposes that will be set forth hereinafter in greater detail. Data swizzling is useful when generating vectors. Such technique allows the efficient generation of a vector cross product and other vectors.

The functional module 302 is capable of carrying out programmable operations and supporting multiple levels of precision. Such levels of precision may include full floating point (i.e. 32-bit), half floating point (i.e. 16-bit), and fixed point. More information regarding the programmable operations and the various levels of precision will be set forth hereinafter in greater detail.

Coupled to the output of the functional module 302 is an input of a register file 308 having three outputs. The register file 308 is also equipped with a vector component writemask module 309. The register file 308 has single write and triple read access. The contents of the register file 308 are initialized to (0,0,0,0) at the start of program execution.

Also included are a pixel source buffer 312 and a constant source buffer 314. The pixel source buffer 312 stores data in the form of pixel data, and may be equipped with write access and/or at least single read access. The constant source buffer 314 stores data in the form of constant data, and may also be equipped with write access and/or at least single read access. It may be read using an absolute address.

Figure 5:
FIG. 5 is a detailed table showing various attributes handled by the pixel source buffer.

In one exemplary embodiment, the pixel source buffer 312 is twelve (12) quad-floats in size (12*128 bits). Operation of the pixel processor module 58 may be commenced when all pixel attributes are valid. The position contains x and y in integer (D3D™) and +0.5 (OpenGL®) window coordinates, z is normalized to the range (0,1), and 1/w is in homogeneous clip space. Such attributes may be mandatory in the current exemplary embodiment. The pixel attributes may also be perspective correct. The colors and fog value may be generated at a lower precision, while the texture coordinates may be generated in high precision, i.e. 32-bit floating point. FIG. 5 is a detailed table 500 showing various attributes handled by the pixel source buffer 312.

Each of the inputs of the functional module 302 is equipped with a multiplexer 316. This allows the outputs of the register file 308, pixel source buffer 312, and constant source buffer 314 to be fed to the inputs of the functional module 302. This is facilitated by buses 318.

While not shown, the functional module 302 may also be coupled to a texture fetch module (not shown) for fetching texture data. Such texture fetch module may also be coupled to the register file 308. It should be noted that frame buffer contents are only visible to the pixel processing module 58 via texture fetches.

There need not necessarily be an explicit connection between texture coordinates and the textures that they may access. It is possible to use the same coordinate, or generated coordinates, to access any of the active textures as many times as desired and in any sequence desired. Programs are allowed access to sixteen (16) active textures. If an accessed texture is not bound, the texture fetch may return (0,0,0,0). The texture fetch instruction specifies the texture identifier desired (i.e. between 0 and 15). In one embodiment, texture components that are in fixed point form may have a bias (0.0,–0.5) and a multiply operation (2x,1x) applied to them before they are returned to the pixel processing module 58. This capability need not necessarily apply to floating point texture components. A texture fetch may return the data at the destination precision.

The pixel processing module 58 of FIG. 3 works well with hardware accelerators. In use, pixels are processed independently. Only one pixel is visible to the pixel processing module 58. As an option, there may be one 4-bit condition code register initialized as equal to 0 at program start.

Figure 4:
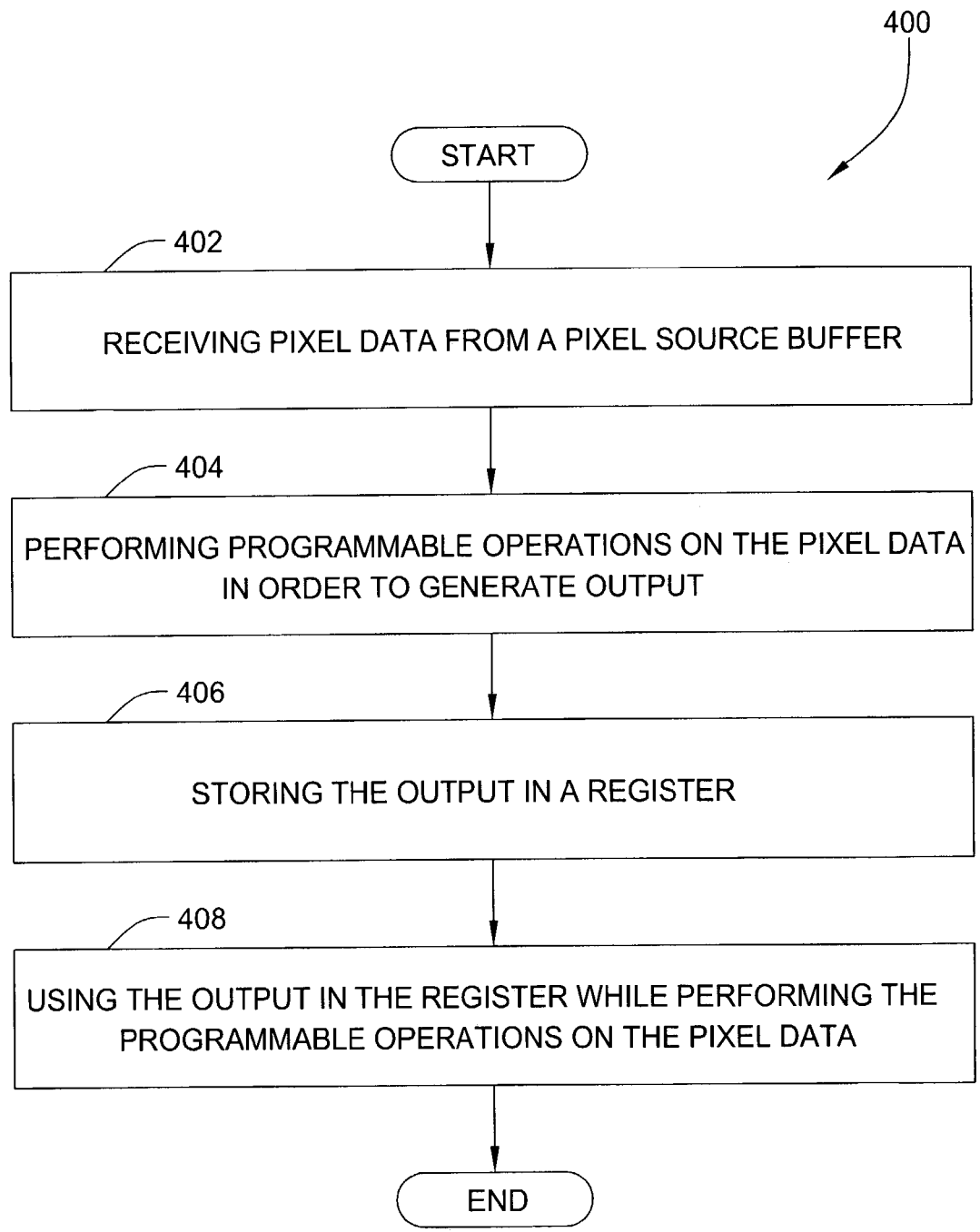
FIG. 4 is a flowchart illustrating the method by which the programming model of FIG. 3 carries out programmable pixel processing in the computer graphics pipeline.

FIG. 4 is a flowchart illustrating the method 400 by which the model of FIG. 3 carries out programmable pixel processing in the computer graphics pipeline. Initially, in operation 402, data is received from a pixel source buffer 312. Such data may include any type of information that is involved during the processing of pixels in the computer graphics pipeline. Further, the pixel source buffer 312 may include any type of memory capable of storing data.

Thereafter, in operation 404, programmable operations, i.e. pixel processing 102, are performed on the data in order to generate output. The programmable operations are capable of generating output that may be stored in the register file 308 in operation 406. During operation 408, the output stored in the register file 308 is used in performing the programmable operations on the data. Thus, the register file 308 may include any type of memory capable of allowing the execution of the programmable operations on the output.

By this design, the present invention allows a user to program a portion of the graphics pipeline that handles pixel processing. This results in an increased flexibility in generating visual effects. Further, the programmable pixel processing of the present invention allows remaining portions of the graphics pipeline to be controlled by the standard API for the purpose of preserving hardware optimizations.

During operation, only one pixel is processed at a time in the functional module 302 that performs the programmable operations. As such, the pixels may be processed independently. Further, the various foregoing operations may be processed for multiple pixels in parallel.

In one embodiment of the present invention, a constant may be received, and the programmable operations may be performed based on the constant. During operation, the constant may be stored in and received from the constant source buffer 314. Further, the constant may be accessed in the constant source buffer 314 using an absolute or relative address. Asian option, there may be one or more address registers for use during reads from the constant source buffer 314. It may be initialized to "0" at the start of program execution in operation 204 of FIG. 2. Further, the constant source buffer 314 may be written with a program which may or may not be exposed to users.

The register file 308 may be equipped with single write and triple read access. Register contents may be initialized to (0,0,0,0) at the start of program execution in operation 204 of FIG. 2.

Figure 6:
FIG. 6 illustrates an instruction set of programmable operations that may be carried out by one embodiment of the present invention.

FIG. 6 illustrates an instruction set of programmable operations 600 that may be carried out by the present invention, in accordance with one embodiment. As shown in FIG. 6, such programmable operations 600 include a no operation, texture fetch, move, derivative, multiply, addition, multiply and addition, reciprocal, reciprocal square root, three component dot product, four component dot product, distance vector, minimum, maximum, pack, unpack, set on less than, set on greater or equal than, floor, fraction, kill pixel, exponential base two (2), logarithm base two (2), and light coefficients.

An exemplary assembly language will now be set forth in the context of which the foregoing operations may be executed. Such language refers to a plurality of resources delineated in Table 2. Note the correspondence with the various components of the model 300 of FIG. 3.

TABLE 2

| | | |
|---|---|---|
| Pixel Source (192B) | p[*] | of size 12 vectors |
| Constant Memory (512B) | c[*] | of size 32 vectors |
| Data Registers/Output (128B) | R0–R7, H0–H15, I0–I7 | of size 8, 16, 8 vectors |
| Condition Codes | RC, HC, IC | of size 4 bits |
| Instruction Storage | | of size 128 instructions |

The data registers and memory locations include four component floating point precision. Further, the registers may be accessed as full floating point precision (fp32: R0–R7), half floating point precision (fp16:H0–H15), or signed 12-bit fixed point precision (s12:I0–I7). These overlap as follows: R0/H0–H1/I0–I1, R1/H2–H3/I2–I3, R2/H4–H5/I4–I5, etc.

Vector components may be swizzled before use via four subscripts (xyzw). An arbitrary component re-mapping may be done. Some examples are shown in Table 3.

TABLE 3

.xyzw means source(x, y, z, w) –> input(x, y, z, w)
.zzxy means source(x, y, z, w) –> input(z, z, x, y)
.xxxx means source(x, y, z, w) –> input(x, x, x, x)
Shortcuts: no subscripts refers to .xyzw (same as writemask)
.x is the same as .xxxx
.y is the same as .yyyy
.z is the same as .zzzz
.w is the same as .wwww All source operands (except condition codes) may be negated by putting a '–' sign in front. The condition codes can be changed whenever data is written (by adding a 'c' to the op-code) and sharing the writemask with the destination. If there is no other destination, RC or HC or IC may be used as a dummy write register. When data is written, each component may compared to 0.0 and its status recorded if the writemask for that component is enabled.

The condition codes are sourced as EQ(equal), NE(not equal), LT(less), GE(greater or equal), LE(less or equal), GT(greater), FL(false), and TR(true), which generates four (4) bits of condition code by applying the specified comparison. As a source (for KIL and writemask modification), the condition codes may be swizzled.

Writes to the register, condition codes, and RC are maskable. Each component is written only if it appears as a destination subscript (from xyzw). Specifying no writemask is the same as a writemask of xyzw. No swizzling may be possible for writemask, and subscripts may be ordered (x before y before z before w). It is also possible to modify the write mask by the condition codes (at the beginning of the instruction) by an 'AND' operation as set forth in Table 4. It should be noted that condition codes here have swizzle control.

TABLE 4

| destination(GT.x) | //writemask[4] = 1111 & GT.xxxx |
| destination.xw(EQ.yyzz) | //writemask[4] = x00w & EQ.yyzz |

An exemplary assembler format is set forth in Table 5.

TABLE 5

OPCODE DESTINATION, SOURCE(S)

Valid sources are the pixel source, constants, and registers. Valid destinations are registers, RC, HC, and IC. Output data is taken from the register file 308. It should be noted that vertex programs use the functional module 302 for output. A particular API mode allows selection of an output format for the color and depth values, and whether the program will generate a new depth value.

A blend function and alpha testing may or may not be available based on the color output format. For example, a blend function and alpha testing may be available if the selected color format is four (4) unsigned bytes. The final color is taken from register R0, H0, or I0. The final color vector, regardless of the precision format, may be stored into a frame buffer assuming a similarly sized color buffer.

If a depth value is to be generated, the final value of R1.x, H1.x, or I1.x holds the new depth value. If depth is not to be generated, the standard pipeline depth is used. Depth is normalized to a (0,1) range which is clamped and scaled by hardware to fit the final depth buffer test format. The depth writemask may apply.

As mentioned earlier, three formats are supported for vector components. More information regarding precision will now be set forth in the context of an exemplary embodiment. Table 6 illustrates each of the various formats.

TABLE 6

Floating point: fp32 (s.e8.m23)
Floating point: fp16 (s.e5.m10)
Signed fixed point: s12 (2.10 in 2's complement,
range of −2 to +2047/1024),
where:
fp32 refers to a 32-bit floating point precision
fp16 refers to a 16-bit floating point precision
s12 refers to fixed point precision It may not necessarily be possible to mix formats inside a vector. Further, in one embodiment, no floating point exceptions or interrupts may be supported. Denorms may be flushed to zero, and NaN may be treated as infinity. Negative 0.0 may also be treated as positive 0.0 in comparisons.

In 32-bit floating point mode, the RCP and RSQ instructions may deliver mantissa results accurate to $1.0/(2^{}22)$. Moreover, the approximate output (.z) in the EXP and LOG instructions only have to be accurate to $1.0/(2^{}11)$. The LIT instruction output (.z) allows error equivalent to the combination of the EXP and LOG combination implementing a power function.

In 16-bit floating point mode, the RCP, RSQ, LOG, and EXP instructions deliver results accurate to within one least significant bit of the correct answer. LIT has at least the accuracy of a LOG, multiply, and EXP sequence in 16-bit floating point mode. In fixed point mode, all calculations are performed and then clamped into the valid range.

Since distance is calculated as $(d*d)*(1/sqrt(d*d))$, 0.0 multiplied by infinity may be 0.0. Since if/then/else evaluation is done by multiplying by 1.0/0.0 and adding the values set forth in Table 7. However, if/then/else evaluation can also be done via condition codes.

TABLE 7

| 0.0 * x = 0.0 | for all x (including infinity and NaN) |
| 1.0 * x = x | for all x (including infinity and NaN) |
| 0.0 + x = x | for all x (including infinity and NaN) |

In one embodiment, the registers may be grouped into 128-bit chunks, each of which may be used as a single 4*fp32 quad-float, two 4*fp16 quad-floats, or two 4*s12 quad-fixed point. There are eight (8) such chunks allowing a maximum of eight (8) registers in fp32 mode and sixteen (16) registers in fp16. It should be noted that there are only eight (8) s12 registers.

The present invention is allowed to use mixed precision registers as sources and destination to an instruction. In this case, conversion to destination precision is done before the instruction is executed. The instruction itself is performed at the destination precision.

If a 128-bit chunk is read in a different format from which it was last written, 0.0 is returned. Pixel source and constants may be in 32-bit floating point precision, but may be reduced to lower precision by the destination.

More information will now be set forth regarding each of the programmable operations 600 of FIG. 6.

No Operation (NOP)

Format:

NOP

Description:

No Operation.

Examples:

NOP

Texture Fetch (TEX,TXP,TXD)

Format:

TEX [c] D[.xyzw][(RC[.xyzw])],[−]S0[.xyzw],#tid

TXP [c] D[.xyzw][(RC[.xyzw])],[−]S0[.xyzw],#tid

TXD [c] D[.xyzw][(RC[.xyzw]]],[−]S0[.xyzw],[−]S1[.xyzw], [−]S2[.xyzw],#tid

Description:

The contents of the source vector are used as a texture coordinate indexing into the specified (via tid:0–15) texture map. The filtered vector resulting is placed into the destination as a quad-float. TEX generates a texture fetch of (x,y,z) while TXP generates a texture fetch of (x/w,y/w,z/w). TXD allows specification of the derivative in x (S1) and y (S2). These may be used for LOD/anisotropic calculations. TXD generates a texture fetch of (x,y,z).

Operation:

Table 8 sets forth an example of operation associated with the TEX, TXP, and TXD instructions.

TABLE 8

```
t.x = source0.c***;  /* c is x or y or z or w */
t.y = source0.*c**;
t.z = source0.**c*;
t.w = source0.***c;
if (-source0)
    t = -t;
q = TextureFetch (t,texid);
if (destination.x) R.x = q.x;
if (destination.y) R.y = q.y;
if (destination.z) R.z = q.z;
if (destination.w) R.w = q.w;
```

Examples:
TEX R2,R3,3//Fetch from texture 3 using R3 as coords.
Derivative X (DDX)
Format:
DDX[c] D[.xyzw][(RC[.xyzw])],[−]S0[.xyzw]
Description:
DDX operates to ensure that the rate of change of the components of the source with respect to the horizontal axis 'X' are placed into the destination.
Operation:
Table 9 sets forth an example of operation associated with the DDX instruction.

TABLE 9

```
t.x = source0.c***;  /* c is x or y or z or w */
t.y = source0.*c**;
t.z = source0.**c*;
t.w = source0.***c;
if (-source0)
    t = -t;
q.x = d(t.x)/dx;
q.y = d(t.y)/dx;
q.z = d(t.z)/dx;
q.w = d(t.w)/dx;
if (destination.x) R.x = q.x;
if (destination.y) R.y = q.y;
if (destination.z) R.z = q.z;
if (destination.w) R.w = q.w;
```

Examples:
DDX R2,R1//Fetch x derivatives of R1
Derivative Y (DDY)
Format:
DDY[c] D[.xyzw][(RC[.xyzw])],[−]S0[.xyzw]
Description:
DDY operates to ensure that the rate of change of the components of the source with respect to the vertical axis 'Y' is placed into the destination.
Operation:
Table 10 sets forth an example of operation associated with the DDY instruction.

TABLE 10

```
t.x = source0.c***;  /* c is x or y or z or w */
t.y = source0.*c**;
t.z = source0.**c*;
t.w = source0.***c;
if (-source0)
    t = -t;
q.x = d(t.x)/dy;
q.y = d(t.y)/dy;
q.z = d(t.z)/dy;
q.w = d(t.w)/dy;
if (destination.x) R.x = q.x;
if (destination.y) R.y = q.y;
if (destination.z) R.z = q.z;
if (destination.w) R.w = q.w;
```

Examples:
DDY R2,R0//Fetch y derivatives of R0
Move (MOV)
Format:
MOV[c] D[.xyzw][(RC[.xyzw])],[−]S0[.xyzw]
Description:
MOV operates to move the contents of the source into a destination.
Operation:
Table 11 sets forth an example of operation associated with the MOV instruction.

TABLE 11

```
t.x = source0.c***;  /* c is x or y or z or w */
t.y = source0.*c**;
t.z = source0.**c*;
t.w = source0.***c;
if (-source0)
    t = -t;
q.x = t.x;
q.y = t.y;
q.z = t.z;
q.w = t.w;
if (destination.x) R.x = q.x;
if (destination.y) R.y = q.y;
if (destination.z) R.z = q.z;
if (destination.w) R.w = q.w;
```

Examples:
MOV RC,−R3//Compare negative R3 to 0.0 and save
MOV R2,p[POS].w//Move w component of v[POS] into xyzw components of R2
MOV R1.xyw,R2.x//Move x component of R2 into x,y,w components of R1
Multiply (MUL)
Format:
MUL[c] D[.xyzw][(RC[.xyzw])],[−]S0[.xyzw],[−]S1[.xyzw]
Description:
MUL operates to multiply sources into a destination. It should be noted that 0.0 times anything is 0.0.
Operation:
Table 12 sets forth an example of operation associated with the MUL instruction.

TABLE 12

```
t.x = source0.c***;  /* c is x or y or z or w */
t.y = source0.*c**;
t.z = source0.**c*;
t.w = source0.***c;
if (-source0)
    t = -t;
u.x = source1.c***;  /* c is x or y or z or w */
u.y = source1.*c**;
u.z = source1.**c*;
u.w = source1.***c;
if (-source1)
    u = -u;
q.x = t.x*u.x;
q.y = t.y*u.y;
q.z = t.z*u.z;
q.w = t.w*u.w;
if (destination.x) R.x = q.x;
if (destination.y) R.y = q.y;
if (destination.z) R.z = q.z;
if (destination.w) R.w = q.w;
```

Examples:
MUL H6,H5,c[CON5]//H6.xyzw=H5.xyzw*c[CON5].xyzw
MUL H6.x,H5.w,−H7//H6.x=H5.w*−H7.x
Add (ADD)

Format:
ADD[c]   D[.xyzw][(RC[.xyzw])],[–]S0[.xyzw],[–]S1[.xyzw]
Description:
ADD serves to add sources into a destination.
Operation:
Table 13 sets forth an example of operation associated with the ADD instruction.

TABLE 13

```
t.x = source0.c***;  /* c is x or y or z or w */
t.y = source0.*c**;
t.z = source0.**c*;
t.w = source0.***c;
if (–source0)
  t = –t;
u.x = source1.c***;  /* c is x or y or z or w */
u.y = source1.*c**;
u.z = source1.**c*;
u.w = source1.***c;
if (–source1)
  u = –u;
q.x = t.x+u.x;
q.y = t.y+u.y;
q.z = t.z+u.z;
q.w = t.w+u.w;
if (destination.x) R.x = q.x;
if (destination.y) R.y = q.y;
if (destination.z) R.z = q.z;
if (destination.w) R.w = q.w;
```

Examples:
ADD HC.x,H5.x,c[CON5]//Compare H5.x+c[CON5].x to 0.0 and set RC.x
ADD H6.x,H5,–H7//H6.x=H5.x–H7.x
ADD H6,–H5,c[CON5]//H6.xyzw=–H5.xyzw+c[CON5].xyzw
Multiply And Add (MAD)
Format:
MAD[c]   D[.xyzw][(RC[.xyzw])],[–]S0[.xyzw],[–]S1[.xyzw], [–]S2[.xyzw]
Description:
MAD serves to multiply and add sources into a destination. It should be noted that 0.0 times anything is 0.0.
Operation:
Table 14 sets forth an example of operation associated with the MAD instruction.

TABLE 14

```
t.x = source0.c***;  /* c is x or y or z or w */
t.y = source0.*c**;
t.z = source0.**c*;
t.w = source0.***c;
if (–source0)
  t = –t;
u.x = source1.c***;  /* c is x or y or z or w */
u.y = source1.*c**;
u.z = source1.**c*;
u.w = source1.***c;
if (–source1)
  u = –u;
v.x = source2.c***;  /* c is x or y or z or w */
v.y = source2.*c**;
v.z = source2.**c*;
v.w = source2.***c;
if (–source2)
  v = –v;
q.x = t.x*u.x+v.x;
q.y = t.y*u.y+v.y;
q.z = t.z*u.z+v.z;
q.w = t.w*u.w+v.w;
if (destination.x) R.x = q.x;
if (destination.y) R.y = q.y;
```

TABLE 14-continued

```
if (destination.z) R.z = q.z;
if (destination.w) R.w = q.w;
```

Examples:
MAD H6,–H5,p[POS],–H3//H6=–H5*p[POS]–H3
MAD H6.z,H5.w,p[POS],H5//H6.z=H5.w*p[POS].z+H5.z
Reciprocal (RCP)
Format:
RCP[c] D[.xyzw][(RC[.xyzw])],[–]S0[xyzw]
Description:
RCP inverts source scalar into a destination. The source may have one subscript. Output may be exactly 1.0 if the input is exactly 1.0.
RCP(–Inf) gives (–0.0,–0.0,–0.0,–0.0)
RCP(–0.0) gives (–Inf,–Inf,–Inf,–Inf)
RCP(+0.0) gives (+Inf,+Inf,+Inf,+Inf)
RCP(+Inf) gives (0.0,0.0,0.0,0.0)
Operation:
Table 15 sets forth an example of operation associated with the RCP instruction.

TABLE 15

```
t.x = source0.c***;  /* c is x or y or z or w */
t.y = source0.*c**;
t.z = source0.**c*;
t.w = source0.***c;
if (–source0)
  t = –t;
if(t.x == 1.0)
  q.x = q.y = q.z = q.w = 1.0;
else
  q.x = q.y = q.z = q.w = 1.0/t.x; where |q.x –
    IEEE(1.0/t.x)| < 1/(2**22) for all 1.0 <= t.x<2.0
if (destination.x) R.x = q.x;
if (destination.y) R.y = q.y;
if (destination.z) R.z = q.z;
if (destination.w) R.w = q.w;
```

Examples:
RCP R2,c[14].x//R2.xyzw=1/c[14].x
RCP R2.w,R3.z//R2.w=1/R3.z
Reciprocal Square Root (RSQ)
Format:
RSQ[c] D[.xyzw][(RC[.xyzw])],[–]S0[xyzw]
Description:
RSQ performs an inverse square root of absolute value of source scalar into a destination. The source may have one subscript. Output may be exactly 1.0 if the input is exactly 1.0.
RSQ(0.0) gives (+Inf,+Inf,+Inf,+Inf)
RSQ(Inf) gives (0.0,0.0,0.0,0.0)
Operation:
Table 16 sets forth an example of operation associated with the RSQ instruction.

TABLE 16

```
t.x = source0.c***;  /* c is x or y or z or w */
t.y = source0.*c**;
t.z = source0.**c*;
t.w = source0.***c;
if (–source0)
  t = –t;
if (t.x == 1.0)
  q.x = q.y = q.z = q.w = 1.0;
else
  q.x=q.y=q.z=q.w=1.0/sqrt(abs(t.x)); with |q.x –
```

TABLE 16-continued

```
IEEE(1.0/sqrt(t.x))| < 1/(2**22) for 1.0 <= t.x<4.0
if (destination.x) R.x = q.x;
if (destination.y) R.y = q.y;
if (destination.z) R.z = q.z;
if (destination.w) R.w = q.w;
```

Examples:
RSQ R3,R3.y//R3=1/sqrt(abs(R3.y))
RSQ R2.w,p[9].x//R2.w=1/sqrt(abs(p[9].x))
Three Component Dot Product (DP3)
Format:
DP3[c]    D[.xyzw][(RC[.xyzw])],[–]S0[.xyzw],[–]S1 [.xyzw]
Description:
DP3 performs a three component dot product of the sources into a destination. It should be noted that 0.0 times anything is 0.0.
Operation:
Table 17 sets forth an example of operation associated with the DP3 instruction.

TABLE 17

```
t.x = source0.c***; /* c is x or y or z or w */
t.y = source0.*c**;
t.z = source0.**c*;
t.w = source0 ***c;
if (–source0)
   t = –t;
u.x = source1.c***; /* c is x or y or z or w */
u.y = source1.*c**;
u.z = source1.**c*;
u.w = source1.***c;
if (–source1)
   u = –u;
q.x = q.y = q.z = q.w = t.x*u.x + t.y*u.y + t.z*u.z;
if (destination.x) R.x = q.x;
if (destination.y) R.y = q.y;
if (destination.z) R.z = q.z;
if (destination.w) R.w = q.w;
```

Examples:
DP3    H6,H3,H4//H6.xyzw=H3.x*H4.x+H3.y*H4.y+ H3.z*H4.z
DP3    H6.w,H3,H4//H6.w=H3.x*H4.x+H3.y*H4.y+ H3.z*H4.z
Four Component Dot Product (DP4)
Format:
DP4[c]    D[.xyzw][(RC[.xyzw])],[–]S0[.xyzw],[–]S1 [.xyzw]
Description:
DP4 performs a four component dot product of the sources into a destination. It should be noted that 0.0 times anything is 0.0.
Operation:
Table 18 sets forth an example of operation associated with the DP4 instruction.

TABLE 18

```
t.x = source0.c***; /* c is x or y or z or w */
t.y = source0.*c**;
t.z = source0.**c*;
t.w = source0.***c;
if (–source0)
   t = –t;
u.x = source1.c***; /* c is x or y or z or w */
u.y = source1.*c**;
u.z = source1.**c*;
```

TABLE 18-continued

```
u.w = source1.***c;
if (–source1)
   u = –u;
q.x = q.y = q.z = q.w = t.x*u.x + t.y*u.y + t.z*u.z + t.w*u.w;
if (destination.x) R.x = q.x;
if (destination.y) R.y = q.y;
if (destination.z) R.z = q.z;
if (destination.w) R.w = q.w;
```

Examples:
DP4    H6,p[POS],c[MV0]//H6.xyzw=p.x*c.x+p.y*c.y+ p.z*c.z+p.w*c.w
DP4    H6.xw,p[POS].w,H3//H6.xw=p.w*H3.x+ p.w*H3.y+p.w*H3.z+p.w*H3.w
Distance Vector (DST)
Format:
DST[c]    D[.xyzw][(RC[.xyzw])],[–]S0[.xyzw],[–]S1 [.xyzw]
Description:
DST calculates a distance vector. A first source vector is assumed to be (NA,d*d,d*d,NA) and second source vector is assumed to be (NA,1/d,NA,1/d). A destination vector is then (1,d,d*d,1/d). It should be noted that 0.0 times anything is 0.0.
Operation:
Table 19 sets forth an example of operation associated with the DST instruction.

TABLE 19

```
t.x = source0.c***; /* c is x or y or z or w */
t.y = source0.*c**;
t.z = source0.**c*;
t.w = source0.***c;
if (–source0)
   t = –t;
u.x = source1.c***; /* c is x or y or z or w */
u.y = source1.*c**;
u.z = source1.**c*;
u.w = source1.***c;
if (–source1)
   u = –u;
q.x = 1.0;
q.y = t.y*u.y;
q.z = t.z;
q.w = u.w;
if (destination.x) R.x = q.x;
if (destination.y) R.y = q.y;
if (destination.z) R.z = q.z;
if (destination.w) R.w = q.w;
```

Examples:
DST R2,R3,H4//R2.xyzw=(1.0,R3.y*H4.y,R3.z,H4.w)
Minimum (MIN)
Format:
MIN[c]    D[.xyzw][(RC[.xyzw])],[–]S0[.xyzw],[–]S1 [.xyzw]
Description:
MIN serves to move a minimum of sources into a destination.
Operation:
Table 20 sets forth an example of operation associated with the MIN instruction.

TABLE 20

```
t.x = source0.c***; /* c is x or y or z or w */
t.y = source0.*c**;
t.z = source0.**c*;
```

TABLE 20-continued

```
t.w = source0.***c;
if (−source0)
    t = −t;
u.x = source1.c***; /*c is x or y or z or w */
u.y = source1.*c**;
u.z = source1.**c*;
u.w = source1.***c;
if (−source1)
    u = −u;
q.x = (t.x < u.x) ? t.x : u.x;
q.y = (t.y < u.y) ? t.y : u.y;
q.z = (t.z < u.z) ? t.z : u.z;
q.w = (t.w < u.w) ? t.w : u.w;
if (destination.x) R.x = q.x;
if (destination.y) R.y = q.y;
if (destination.z) R.z = q.z;
if (destination.w) R.w = q.w;
```

Examples:
MIN R2,R3,H0//R2=component min(R3,H0)
MIN R2.x,R3.z,H0//R2.x=min(R3.z,H0.x)
MIN CH,R3.z,H0//Compare min(R3.z,H0.xyzw) to 0.0 and set RC
Maximum (MAX)
Format:
MAX[c]   D[.xyzw][(RC[.xyzw])],[−]S0[.xyzw],[−]S1[.xyzw]
Description:
MAX moves a maximum of sources into a destination.
Operation:
Table 21 sets forth an example of operation associated with the MAX instruction.

TABLE 21

```
t.x = source0.c***; /* c is x or y or z or w */
t.y = source0.*c**;
t.z = source0.**c*;
t.w = source0.***c;
if (−source0)
    t = −t;
u.x = source1.c***; /* c is x or y or z or w */
u.y = source1.*c**;
u.z = source1.**c*;
u.w = source1.***c;
if (−source1)
    u = −u;
q.x = (t.x >= u.x) ? t.x : u.x;
q.y = (t.y >= u.y) ? t.y : u.y;
q.z = (t.z >= u.z) ? t.z : u.z;
q.w = (t.w >= u.w) ? t.w : u.w;
if (destination.x) R.x = q.x;
if (destination.y) R.y = q.y;
if (destination.z) R.z = q.z;
if (destination.w) R.w = q.w;
```

Examples:
MAX R2,R3,H0//R2=component max(R3,H0)
MAX R2.w,R3.x,H0//R2.w=max(R3.x,H0.w)
Pack2 (PK2)
Format:
PK2[c] D[.xyzw][(RC[.xyzw])],[−]S0[.xyzw]
Description:
PK2 packs two source components (.xy after swizzle) into a destination. The destination may be a fp32 "R" register. The source components are converted into fp16 format and packed into a destination.
Operation:
Table 22 sets forth an example of operation associated with the PK2 instruction.

TABLE 22

```
t.x = source0.c***; /* c is x or y or z or w */
t.y = source0.*c**;
t.z = source0.**c*;
t.w = source0.***c;
if (−source0)
    t = −t;
t.x = fp16(t.x);
t.y = fp16(t.y);
q.x = q.y = q.z = q.w = ((t.x) | (t.y<<16)); /* raw bit packing */
if (destination.x) R.x = q.x;
if (destination.y) R.y = q.y;
if (destination.z) R.z = q.z;
if (destination.w) R.w = q.w;
```

Examples:
PK2 R0.z,R3//pack x,y components of R3 into R0.z
Pack4 (PK4)
Format:
PK4[c] D[.xyzw][(RC[.xyzw])],[−]S0[.xyzw]
Description:
PK4 packs four source components into a destination. The destination may be a fp32 "R" register. The source components are clamped to the range (−1.008,1.0) before being packed into a destination as unsigned 8 bit bytes.
Operation:
Table 23 sets forth an example of operation associated with the PK4 instruction.

TABLE 23

```
t.x = source0.c***; /* c is x or y or z or w */
t.y = source0.*c**;
t.z = source0.**c*;
t.w = source0.***c;
if (−source0)
    t = −t;
q.x = t.x; if (q.x > 1.0) q.x = 1.0; else if (q.x < −1.008) q.x = −1.008;
q.y = t.y; if (q.y > 1.0) q.y = 1.0; else if (q.y < −1.008) q.y = −1.008;
q.z = t.z; if (q.z > 1.0) q.z = 1.0; else if (q.z < −1.008) q.z = −1.008;
q.w = t.w; if (q.w > 1.0) q.w = 1.0; else if (q.w < −1.008) q.w = −1.008;
ub.x = 127.0*q.x + 128; /* ub is unsigned byte vector */
ub.y = 127.0*q.y + 128;
ub.z = 127.0*q.z + 128;
ub.w = 127.0*q.w + 128;
q.x = q.y = q.z = q.w = ((ub.x) | (ub.y<<8) | (ub.z<<16) | (ub.w<<24)); /* raw bit packing */
if (destination.x) R.x = q.x;
if (destination.y) R.y = q.y;
if (destination.z) R.z = q.z;
if (destination.w) R.w = q.w;
```

Examples:
PK4 R0.z,R3//pack 4 components of R3 into R0.z
Unpack2 (UP2)
Format:
UP2[c] D[.xyzw][(RC[.xyzw])], [−]S0.[xyzw]
Description:
UP2 unpacks source component into a destination. The source may be a fp32 "R" register scalar. The source component is assumed to be a packed fp16 pair.
Operation:
Table 24 sets forth an example of operation associated with the UP2 instruction.

TABLE 24

```
t.x = source0.c***; /* c is x or y or z or w */
t.y = source0.*c**;
t.z = source0.**c*;
t.w = source0.***c;
```

TABLE 24-continued

```
    if (-source0)
        t = -t;
    q.x = q.z = (t.x>> 0) & 0xffff; /* use raw bits of t.x */
    q.y = q.w = (t.x>>16) & 0xffff; /* use raw bits of t.x */
    if (destination.x) R.x = q.x;
    if (destination.y) R.y = q.y;
    if (destination.z) R.z = q.z;
    if (destination.w) R.w = q.w;
```

Examples:

UP2 R0.xy,R3.y//unpack two components of R3.y into R0.xy

Unpack4 (UP4)

Format:

UP4[c] D[.xyzw][(RC[.xyzw])], [−]S0. [xyzw]

Description:

UP4 unpacks source component into a destination. The source may be a fp32 "R" register scalar. The source component is assumed to be a packed unsigned 8-bit quartet and all are biased and scaled back into the range (−1.008, 1.0) before assignment to destination.

Operation:

Table 25 sets forth an example of operation associated with the UP4 instruction.

TABLE 25

```
    t.x = source0.c***; /* c is x or y or z or w */
    t.y = source0.*c**;
    t.z = source0.**c*;
    t.w = source0.***c;
    if (-source0)
        t = -t;
    q.x = (t.x>> 0) & 0xff; /* use raw bits of t.x */
    q.y = (t.x>> 8) & 0xff; /* use raw bits of t.x */
    q.z = (t.x>>16) & 0xff; /* use raw bits of t.x */
    q.w = (t.x>>24) & 0xff; /* use raw bits of t.x */
    q.x = (q.x − 128)/127.0;
    q.y = (q.y − 128)/127.0;
    q.z = (q.z − 128)/127.0;
    q.w = (q.w − 128)/127.0;
    if (destination.x) R.x = q.x;
    if (destination.y) R.y = q.y;
    if (destination.z) R.z = q.z;
    if (destination.w) R.w = q.w;
```

Examples:

UP4 R0,R3.x//unpack four components of R3.x into R0.xyzw

Set On Less Than (SLT)

Format:

SLT[c] D[.xyzw][(RC[.xyzw])],[−]S0[.xyzw],[−]S1 [.xyzw]

Description:

SLT sets the destination to 1.0/0.0 if source0 is less_than/ greater_or_equal to source1. The following relationships should be noted:

SetEQ R0,R1=(SGE R0,R1)*(SGE−R0,−R1)

SetNE R0,R1=(SLT R0,R1)+(SLT−R0,−R1)

SetLE R0,R1=SGE−R0,−R1

SetGT R0,R1=SLT−R0,−R1

Operation:

Table 26 sets forth an example of operation associated with the SLT instruction.

TABLE 26

```
    t.x = source0.c***; /* c is x or y or z or w */
    t.y = source0.*c**;
    t.z = source0.**c*;
    t.w = source0.***c;
    if (-source0)
        t = -t;
    u.x = source1.c***; /* c is x or y or z or w */
    u.y = source1.*c**;
    u.z = source1.**c*;
    u.w = source1.***c;
    if (-source1)
        u = -u;
    q.x = (t.x < u.x) ? 1.0 : 0.0;
    q.y = (t.y < u.y) ? 1.0 : 0.0;
    q.z = (t.z < u.z) ? 1.0 : 0.0;
    q.w = (t.w < u.w) ? 1.0 : 0.0;
    if (destination.x) R.x = q.x;
    if (destination.y) R.y = q.y;
    if (destination.z) R.z = q.z;
    if (destination.w) R.w = q.w;
```

Examples:

SLT H4,H3,H7//H4.xyzw=(H3.xyzw<H7.xyzw ? 1.0:0.0)

SLT H3.xz,H6.w,H4//H3.xz=(H6.w<H4.xyzw? 1.0:0.0)

Set on Greater or Equal than (SGE)

Format:

SGE[c] D[.xyzw][(RC[.xyzw])],[−]S0[.xyzw],[−]S1 [.xyzw]

Description:

SGE sets the destination to 1.0/0.0 if source0 is greater_ or_equal/less_than source1.

Operation:

Table 27 sets forth an example of operation associated with the SGE instruction.

TABLE 27

```
    t.x = source0.c***; /* c is x or y or z or w */
    t.y = source0.*c**;
    t.z = source0.**c*;
    t.w = source0.***c;
    if (-source0)
        t = -t;
    u.x = source1.c***; /* c is x or y or z or w */
    u.y = source1.*c**;
    u.z = source1.**c*;
    u.w = source1.***c;
    if (-source1)
        u = -u;
    q.x = (t.x >= u.x) ? 1.0 : 0.0;
    q.y = (t.y >= u.y) ? 1.0 : 0.0;
    q.z = (t.z >= u.z) ? 1.0 : 0.0;
    q.w = (t.w >= u.w) ? 1.0 : 0.0;
    if (destination.x) R.x = q.x;
    if (destination.y) R.y = q.y;
    if (destination.z) R.z = q.z;
    if (destination.w) R.w = q.w;
```

Examples:

SGE H4,H3,H7//H4.xyzw=(H3.xyzw>=H7.xyzw? 1.0:0.0)

SGE H3.xz,H6.w,H4//H3.xz=(H6.w>=H4.xyzw? 1.0:0.0)

Floor (FLR)

Format:

FLR[c] D[.xyzw][(RC[.xyzw])],[−]S0[.xyzw]

Description:

FLR set the destination to floor of source.

Operation:

Table 28 sets forth an example of operation associated with the FLR instruction.

TABLE 28

```
t.x = source0.c***; /* c is x or y or z or w */
t.y = source0.*c**;
t.z = source0.**c*;
t.w = source0.***c;
if (-source0)
    t = -t;
q.x = floor(t.x);
q.y = floor(t.y);
q.z = floor(t.z);
q.w = floor(t.w);
if (destination.x) R.x = q.x;
if (destination.y) R.y = q.y;
if (destination.z) R.z = q.z;
if (destination.w) R.w = q.w;
```

Examples:
FLR H4.z,R3//H4.z=floor(R3.z)
Fraction (FRC)
Format:
FRC[c] D[.xyzw][(RC[.xyzw])],[-]S0[.xyzw]
Description:
FRC sets a destination to a fractional part of a source. The fraction is 0.0<=fraction<1.0.
Operation:
Table 29 sets forth an example of operation associated with the FRC instruction.

TABLE 29

```
t.x = source0.c***; /* c is x or y or z or w */
t.y = source0.*c**;
t.z = source0.**c*;
t.w = source0.***c;
if (-source0)
    t = -t;
q.x = t.x - floor(t.x);
q.y = t.y - floor(t.y);
q.z = t.z - floor(t.z);
q.w = t.w - floor(t.w);
if (destination.x) R.x = q.x;
if (destination.y) R.y = q.y;
if (destination.z) R.z = q.z;
if (destination.w) R.w = q.w;
```

Examples:
FRC H4.z,R3//H4.z=R3.z-floor(R3.z)
Kill Pixel (KIL)
Format:
KIL RC[.xyzw]
Description:
KIL kills the pixel based on any of the RC bits (post swizzle) being TRUE. KIL cannot set the condition codes.
Operation:
Table 30 sets forth an example of operation associated with the KIL instruction.

TABLE 30

```
b.x = RC.c***; /* c is x or y or z or w */
b.y = RC.*c**;
b.z = RC.**c*;
b.w = RC.***c;
if (b.x | b.y | b.z | b.w)
    Kill pixel;
```

Examples:
KIL EQ//Kill pixel if RC x or y or z or w are=0.0
KIL LT.x//Kill pixel if RC x bit<0.0
KIL NE.xxzz//Kill pixel if x or z RC bits !=0.0
Exponential Base 2 (EXP)
Format:
EXP[c] D[.xyzw] [(RC[.xyzw])],[-]S0.[xyzw]
Description:
EXP generates an approximate answer in dest.z and allows for a more accurate answer of dest.x*FUNC(dest.y) where FUNC is some user approximation to 2**dest.y (0.0<=dest.y<1.0). EXP accepts a scalar source0. Reduced precision arithmetic is acceptable in evaluating dest.z.
EXP(-Inf) or underflow gives (0.0,0.0,0.0,1.0)
EXP(+Inf) or overflow gives (+Inf,0.0,+Inf,1.0)
Operation:
Table 31 sets forth an example of operation associated with the EXP instruction.

TABLE 31

```
t.x = source0.c***; /* c is x or y or z or w */
t.y = source0.*c**;
t.z = source0.**c*;
t.w = source0.***c;
if (-source0)
    t = -t;
q.x = 2**TruncateTo-Infinity(t.x);
q.y = t.x - TruncateTo-Infinity(t.x);
q.z = q.x * APPX(q.y); where |exp(q.y*LN2-APPX(q.y)|
    < 1/(2**11) for all 0<=q.y<1.0
q.w = 1.0;
if (destination.x) R.x = q.x;
if (destination.y) R.y = q.y;
if (destination.z) R.z = q.z;
if (destination.w) R.w = q.w;
```

Examples:
EXP H4,R3.z
Logarithm Base 2 (LOG)
Format:
LOG[c] D[.xyzw][(RC[.xyzw])],[-]S0[xyzw]
Description:
LOG generates an approximate answer in dest.z and allows for a more accurate answer of dest.x+FUNC(dest.y) where FUNC is some user approximation of log2(dest.y) (1.0<=dest.y<2.0). LOG accepts a scalar source0 of which the sign bit is ignored. LOG provides reduced precision arithmetic is acceptable in evaluating dest.z.
LOG(0.0) gives (-Inf,1.0,-Inf,1.0)
LOG(Inf) gives (Inf,1.0,Inf,1.0)
Operation:
Table 32 sets forth an example of operation associated with the LOG instruction.

TABLE 32

```
t.x = source0.c***; /* c is x or y or z or w */
t.y = source0.*c**;
t.z = source0.**c*;
t.w = source0.***c;
if (-source0)
    t = -t;
if (abs(t.x) != 0.0) {
    q.x = exponent(t.x) (-128.0 <= e < 127)
    q.y = mantissa(t.x) (1.0 <= m < 2.0)
    q.z = q.x + APPX(q.y) where |log(q.y)/LN2-APPX(q.y)| <
1/(2**11) for all 1.0<=q.y<2.0
    q.w = 1.0;
}
else {
    q.x = -inf; q.y = 1.0; q.z = -inf; q.w = 1.0;
}
if (destination.x) R.x = q.x;
if (destination.y) R.y = q.y;
if (destination.z) R.z = q.z;
if (destination.w) R.w = q.w;
```

Examples:

LOG H4,R3.z

Light Coefficients (LIT)

Format:

LIT[c] D[.xyzw][(RC[.xyzw])],[−]S0[.xyzw]

Description:

LIT provides lighting partial support. LIT calculates lighting coefficients from two dot products and a power. Source vector is:

Source0.x=n*l (unit normal and light vectors)
Source0.y=n*h (unit normal and halfangle vectors)
Source0.z is unused
Source0.w=power Reduced precision arithmetic is acceptable in evaluating dest.z. Allowed error is equivalent to a power function combining the LOG and EXP instructions (EXP(w*LOG (y))). An implementation may support at least 8 fraction bits in the power. It should be noted that since 0.0 times anything may be 0.0, taking any base to the power of 0.0 yields 1.0.

Operation:

Table 33 sets forth an example of operation associated with the LIT instruction.

TABLE 33 t.x = source0.c***;  /* c is x or y or z or w */
t.y = source0.*c**;
t.z = source0.**c*;
t.w = source0.***c;
if (−source0)
    t = −t;
if (t.w < −127.9961) t.w = −127.9961; /* assuming power is s8.8 */
else if (t.w > 127.9961) t.w = 127.9961;
if (t.x < 0.0) t.x = 0.0;
if (t.y < 0.0) t.y = 0.0;
q.x = 1.0;                              /* ambient */
q.y = t.x;                              /* diffuse */
q.z = (t.x > 0.0 ? EXP(t.w*LOG(t.y)) : 0.0);    /* specular */
q.w = 1.0;
if (destination.x) R.x = q.x;
if (destination.y) R.y = q.y;
if (destination.z) R.z = q.z;
if (destination.w) R.w = q.w;

Examples:

LIT R0,R3

Appendix A sets forth a plurality of programming examples.

Although the above description discloses a plurality of predefined programs, e.g., as shown in FIG. 6, the present invention is not so limited. Specifically, the examples provided above illustrated an exemplary approach where a texture lookup is followed by the execution of one or more predefined instruction sets and then is followed by another texture lookup based on the calculations performed by the predefined instruction sets. This iterative approach can be repeated in accordance with a particular implementation requirement.

However, the present invention can be more broadly applied. Namely, the present invention allows any instructions that employ an arbitrary computed quantity or parameter as texture address. To state in another manner, the hardware that implements the shader is not limited to a predefined set of instruction sets. Instead, the shader can be implemented to be fully programmable such that any arbitrary computed quantity can be employed as texture address.

Figure 7:
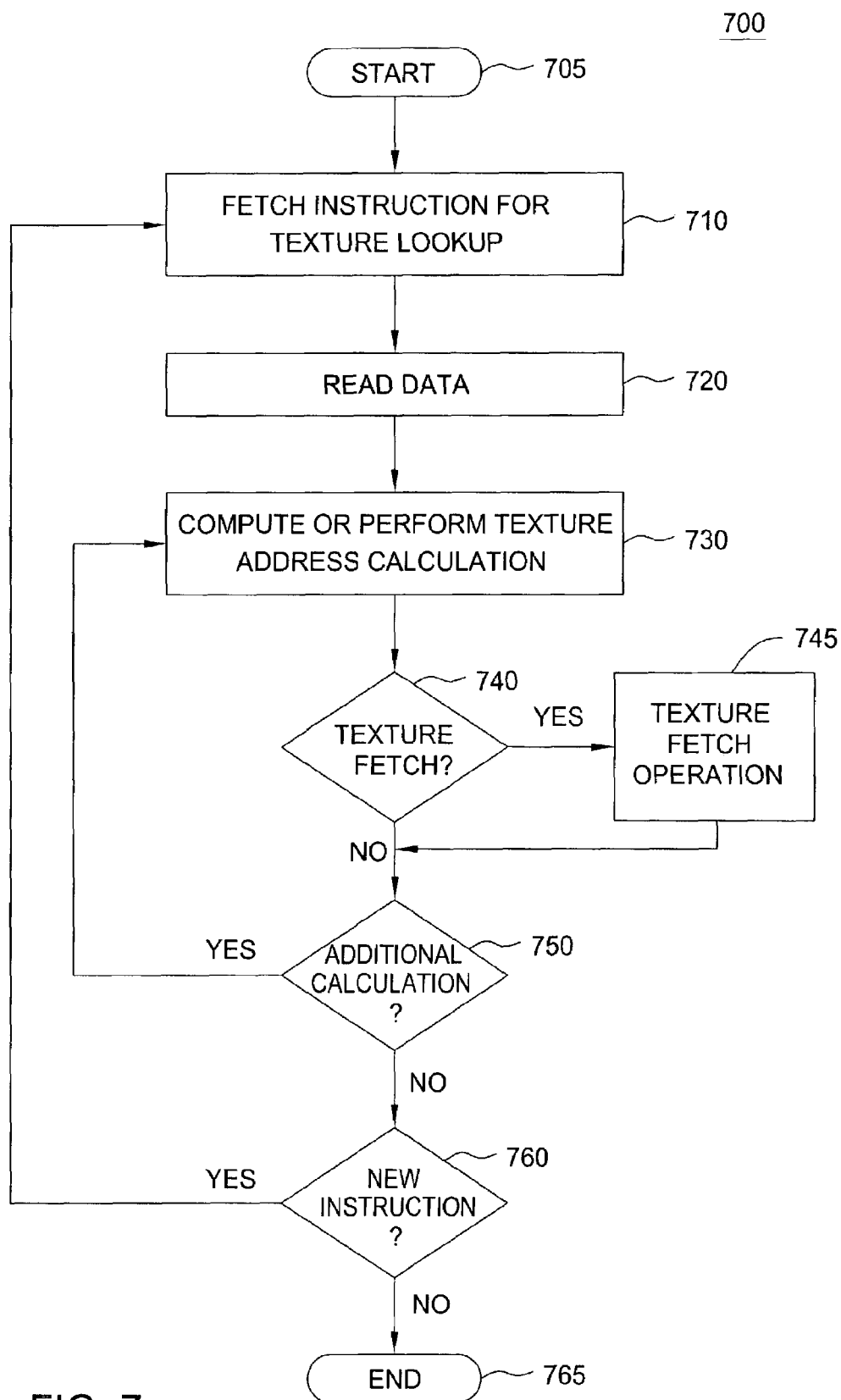
FIG. 7 illustrates a method for using a computed arbitrary quantity as texture address.

FIG. 7 illustrates a method 700 for using a computed arbitrary quantity as texture address. Method 700 starts in step 705 and proceeds to step 710.

In step 710, method 700 fetches a program, e.g., a program for texture lookup. The program can be stored in a storage that can be accessed by pixel processor 58. In fact, the program can be written at a later time and loaded into a storage to be fetched by the pixel processor 58, thereby allowing pixel processor 58 to be fully programmable. This novel approach addresses the criticality where texture coordinates are limited to a small set of possible inputs, e.g., interpolated values and predefined simple functions. Removal of the restriction increases by a very large quantity the number of interesting pixel shader programs that can be written. Additionally, this programmable approach will allow such programs to be written in a more efficient and flexible manner to produce a particular effect.

In step 720, the pertinent data is read, e.g., from a register. The pertinent data is defined by the fetched program.

In step 730, method 700 computes or performs a texture address calculation in accordance with a function defined by the fetched program. The calculation produces an arbitrary quantity that is stored in a storage, e.g., in a register or memory. It should be noted that step 730 can execute any functions, including one of the plurality of instruction sets as disclosed above. For example, the functions may include the result from one or more previous texture lookups, any mathematical function computable by a shader program including pseudorandom noise, solutions of partial differential and integral equations, and so on.

In step 740, method 700 queries whether a texture fetch operation or a texture look-up operation is performed. If the query is positively answered, then method 700 proceeds to step 745, where the computed arbitrary quantity is applied as texture address, i.e., texture information is retrieved during a texture look-up operation using the computed arbitrary quantity. If the query is negatively answered, then method 700 proceeds to step 750.

In step 750, method 700 queries whether another calculation is to be performed, e.g., whether additional shading operation 730 is to be performed. If the query is positively answered, then method 700 proceeds to step 730, where another iteration (steps 730–745) is executed. If the query is negatively answered, then method 700 proceeds to step 760.

In step 760, method 700 queries whether another or new instruction set is to be fetched. If the query is positively answered, then method 700 proceeds to step 710, and the steps 710–750 are repeated in accordance with the new program. If the query is negatively answered, then method 700 ends in step 765.

It should be noted that method 700 and/or some of the steps of method 700 may be represented by one or more software applications (or even a combination of software and hardware, e.g., using application specific integrated circuits (ASICS)), where the software is loaded from a storage medium, (e.g., a magnetic or optical drive, a diskette or a ROM) and operated by the CPU in the memory of a computing device. As such, the methods (including associated steps and data structures) of the present invention can be stored on a computer readable medium, e.g., RAM memory, ROM, magnetic or optical drive or diskette and the like.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

APPENDIX A

The #define statements are meant for a cpp run.

1)

;Absolute Value H4=abs(R0)
   MAX H4,R0,-R0;

2)

;Cross Product | i j k | into R2

; |R0.x R0.y R0.z|

; |R1.x R1.y R1.z|
   MUL R2,R0.zxyw,R1.yzxw;
   MAD R2,R0.yzxw,R1.zxyw,-R2;

4)

;reduce R1 to fundamental period define PERIOD 70; location PERIOD is 1.0/(2*PI),2*PI, 0.0,0.0
   MUL R0,R1,c[PERIOD].x;//divide by period
   FRC R2,R0;
   MUL R2,R2,c[PERIOD].y;//multiply by period

5)

;H4=p→weight.x*H2+(1.0-p→weight.x)*H3 define IWGT 8; source weight
   ADD H4,H2,-H3;//LERP
   MAD H4,p[IWGT].x,H4,H3;

6)

;R0=(GT.x || LT.y) ? R1: R2;
   MOV R0,R2;
   MOV R0(GT.x),R1;
   MOV R0(LT.y),R1;

7)

;R0.y=(EQ.xzw && LT.y) ? R1.z: R2.w;
   MOV R0.y,R1.z;
   MOV R0.y(NE.xzww),R2.w;
   MOV R0.y(GE.y),R2.w;

What is claimed is:

1. A method for performing texture addressing, said method comprising:
   invoking a programmable pixel model permitting access to a portion of a graphics application programming interface (API) state;
   reading a first program for texture lookup, the first program including opcodes specifying programmable operations used to produce a computed quantity, wherein the first program does not include an interpolation function;
   executing the first program within a pixel processor corresponding to said programmable pixel model to produce said computed quantity; and
   deriving a texture address for a texture fetch from said computed quantity wherein said computed quantity is computed from pixel data that includes a pixel diffuse color, a specular color, or a fog value.

2. The method of claim 1, wherein said computed quantity is computed in accordance with a function that is defined by said opcodes.

3. The method of claim 1, wherein said executing step and deriving step are repeated in one or more iterations.

4. The method of claim 1, wherein said first program is fetched from a storage.

5. The method of claim 1, wherein said first program is replaced with a second program for texture lookup.

6. The method of claim 5, wherein said computed quantity is computed in accordance with a function that is defined by opcodes specifying programmable operations in said second program.

7. The method of claim 1, wherein said graphics API state was generated by a standard graphics API.

8. The method of claim 1, wherein said computed quantity is a result from one or more previous texture lookups.

9. The method of claim 1, wherein said computed quantity is computed using a result of a mathematical function computable by a shader program.

10. The method of claim 9, wherein said mathematical function includes a pseudorandom noise.

11. The method of claim 9, wherein said mathematical function includes a solution of a partial differential equation or a solution of an integral equation.

12. The method of claim 1, wherein one of said opcodes uses a mixed precision register as a source or a destination.

13. The method of claim 1, wherein said portion of said graphics application programming interface state is a bound texture state.

14. A computer-readable medium having stored thereon a plurality of instructions, the plurality of instructions including instructions which, when executed by a processor, cause the processor to perform the steps comprising:
   invoking a programmable pixel model permitting access to a portion of a graphics application programming interface (API) state;
   reading a first program for texture lookup, the first program including opcodes specifying programmable operations used to produce a computed quantity, wherein the first program does not include an interpolation function;
   executing the first program within a pixel processor corresponding to said programmable pixel model to produce said computed quantity; and
   deriving a texture address for a texture fetch from said computed quantity wherein said computed quantity is computed from pixel data that includes a pixel diffuse color, a specular color, or a fog value.

15. The computer-readable medium of claim 14, wherein said computed quantity is computed in accordance with a function that is defined by said opcodes.

16. The computer-readable medium of claim 15, wherein said graphics API state was generated by a standard graphics API.

17. The computer-readable medium of claim 14, wherein said executing step and deriving step are repeated in one or more iterations.

18. The computer-readable medium of claim 14, wherein said first program is fetched from a storage.

19. The computer-readable medium of claim 14, wherein said first program is replaced with a second program for texture lookup.

20. The computer-readable medium of claim 19, wherein said computed quantity is computed in accordance with a function that is defined by opcodes specifying programmable operations in said second program.

21. The computer-readable medium of claim 14, wherein said computed quantity is a result from one or more previous texture lookups.

22. The computer-readable medium of claim 14, wherein said computed quantity is computed using a result of a mathematical function computable by a shader program.

23. The computer-readable medium of claim 22, wherein said mathematical function includes a pseudorandom noise.

24. The computer-readable medium of claim 22, wherein said mathematical function includes a solution of a partial differential equation or a solution of an integral equation.

25. A system for performing texture addressing in a computer graphics pipeline, comprising:
 means for invoking a programmable pixel model permitting access to a portion of a graphics application programming interface (API) state;
 means for reading a first program for texture lookup, the first program including opcodes specifying programmable operations used to produce a computed quantity, wherein the first program does not include an interpolation function;
 means for executing the first program within a pixel processor corresponding to said programmable pixel model to produce said computed quantity; and
 means for deriving a texture address for a texture fetch from said computed quantity wherein said computed quantity is computed from pixel data that includes a pixel diffuse color, a specular color, or a fog value.

26. The system of claim 25, wherein said computed quantity is computed in accordance with a function that is defined by said opcodes.

27. The system of claim 26, wherein said graphics API state was generated by a standard API.

28. The system of claim 25, wherein said first is executed and said texture address is derived in one or more iterations.

29. The system of claim 25, further comprising:
 a storage, wherein said first program is fetched from said storage.

30. The system of claim 25, wherein said first program is replaced with a second program for texture lookup.

31. The system of claim 30, wherein said computed quantity is computed in accordance with a function that is defined by opcodes specifying programmable operations in said second program.

32. The system of claim 25, wherein said computed quantity is a result from one or more previous texture lookups.

33. The system of claim 25, wherein said computed quantity is a computed using a result of mathematical function computable by a shader program.

34. The system of claim 33, wherein said mathematical function includes a pseudorandom noise.

35. The system of claim 33, wherein said mathematical function includes a solution of a partial differential equation or a solution of an integral equation.

36. A method for performing texture addressing, said method comprising:
 invoking a programmable pixel model permitting access to a portion of a graphics application programming interface (API) state;
 reading a first program for texture lookup, the first program including opcodes specifying programmable operations used to produce a computed quantity;
 executing the first program within a pixel processor corresponding to said programmable pixel model to produce said computed quantity using a mathematical function including a pseudorandom noise, a solution of a partial differential equation or a solution of an integral equation; and
 deriving a texture address for a texture fetch from said computed quantity wherein said computed quantity is computed from pixel data that includes a pixel diffuse color, a specular color, or a fog value.

* * * * *